（12） United States Patent
Hashimoto (10) Patent No.: US 7,785,201 B2
(45) Date of Patent: Aug. 31, 2010

(54) BACKGROUND IMAGE ACQUISITION METHOD, VIDEO GAME APPARATUS, BACKGROUND IMAGE ACQUISITION PROGRAM, AND COMPUTER-READABLE MEDIUM CONTAINING COMPUTER PROGRAM (75) Inventor: Yoshihisa Hashimoto, Tokyo (JP)

(73) Assignee: Sega Corporation (JP)

( * ) Notice: Subject to any disclaimer, the term of this patent is extended or adjusted under 35 U.S.C. 154(b) by 263 days.

(21) Appl. No.: 11/219,377

(22) Filed: Sep. 2, 2005

(65) Prior Publication Data
US 2006/0046846 A1 Mar. 2, 2006

(30) Foreign Application Priority Data
Sep. 2, 2004 (JP) ............................. 2004-255947

(51) Int. Cl.
A63F 9/24 (2006.01)
A63F 13/00 (2006.01)
(52) U.S. Cl. .......................... 463/36; 463/1; 345/158; 382/284; 382/294
(58) Field of Classification Search ................ 463/1, 463/36; 345/158; 382/284, 294
See application file for complete search history.

(56) References Cited

U.S. PATENT DOCUMENTS

| 5,454,043 | A  | * | 9/1995 | Freeman ..................... 382/168 |
| 5,704,836 | A  | * | 1/1998 | Norton et al. ................. 463/36 |
| 6,072,494 | A  | * | 6/2000 | Nguyen ....................... 715/863 |
| 6,176,782 | B1 | * | 1/2001 | Lyons et al. .................. 463/36 |
| 6,183,367 | B1 | * | 2/2001 | Kaji et al. ....................... 463/1 |
| 6,678,413 | B1 | * | 1/2004 | Liang et al. .................. 382/181 |
| 6,771,277 | B2 | * | 8/2004 | Ohba .......................... 345/629 |
| 6,798,897 | B1 | * | 9/2004 | Rosenberg ................... 382/294 |
| 6,890,262 | B2 | * | 5/2005 | Oishi et al. .................... 463/31 |
| 7,071,914 | B1 | * | 7/2006 | Marks ......................... 345/156 |
| 7,227,526 | B2 | * | 6/2007 | Hildreth et al. ............. 345/156 |
| 2002/0097247 | A1 | | 7/2002 | Ohba |

(Continued)

FOREIGN PATENT DOCUMENTS

CN 1394325 1/2003

(Continued)

OTHER PUBLICATIONS

Tracy, Tim. EyeToy: Play Review [online]. Nov. 4, 2003 [retreived Sep. 17, 2007]. Retreived from the Internet: <http://www.gamespot.com/ps2/action/eyetoy/review.html?sid=6078136&,print=1>.*

*Primary Examiner*—Peter DungBa Vo
*Assistant Examiner*—David Duffy
(74) *Attorney, Agent, or Firm*—Baker + Hostetler, LLP (57) ABSTRACT A background image acquisition technique is disclosed for acquiring a background image that is required for calculating a background difference in a video game that uses an input image supplied by a camera while enabling command input through image recognition of a player image. The background image acquisition technique involves compositing a button item for responding to an operation of a player with a portion of an image captured by the camera which captured image includes a player image representing the posture of the player, displaying the composite image on a monitor screen, guiding the player into position such that the player image is accommodated within said portion of the captured image, and acquiring an image of a region of the captured image other than said portion as the background image.

13 Claims, 11 Drawing Sheets

U.S. PATENT DOCUMENTS

2002/0168091 A1* 11/2002 Trajkovic .................... 382/294
2003/0003992 A1*  1/2003 Furuya ........................ 463/36
2003/0107653 A1*  6/2003 Utsumi et al. .......... 348/207.99

FOREIGN PATENT DOCUMENTS

| | | |
|---|---|---|
| EP | 1 279 425 A | 1/2003 |
| GB | 2 398 691 A | 8/2004 |
| JP | 2000-36032 | 2/2000 |
| JP | 2003-135851 A | 5/2003 |

* cited by examiner

FIG.12A (SLOW DOWN)

FIG.12D (TURN RIGHT)

FIG.12B (SLIGHTLY ACCELERATE)

FIG.12E (TURN LEFT)

FIG.12C (ACCELERATE)

FIG.14A

(ASCEND WHILE MOVING FORWARD)

FIG.14B

(LEVEL OFF)

FIG.14C

(DESCEND WHILE MOVING FORWARD)

FIG.14D

(TURN RIGHT WHILE MOVING FORWARD)

FIG.14E (TURN LEFT WHILE MOVING FORWARD)

FIG.14F (ABRUPTLY ACCELERATE)

BACKGROUND IMAGE ACQUISITION METHOD, VIDEO GAME APPARATUS, BACKGROUND IMAGE ACQUISITION PROGRAM, AND COMPUTER-READABLE MEDIUM CONTAINING COMPUTER PROGRAM

BACKGROUND OF THE INVENTION

1. Field of the Invention

The present invention relates to a background image acquisition method, a video game apparatus, a background image acquisition program, and a computer-readable medium containing a computer program that are implemented for a video game using an input image supplied by a camera.

2. Description of the Related Art

In recent years and continuing, a video game using an input image supplied by a camera is becoming increasingly popular. In this type of video game, for example, an image of the posture of a player is captured by a camera and the captured image is composited with an image such as a button item. The composite image may be displayed on a monitor, and when the hand (arm) of the player is moved over the button item, the button item may respond to the movement and instigate an action, for example. In this case, a command input may be made solely based on the image captured by the camera, and a game controller (control pad operated by the hand) may not be necessary for controlling the playing of a game.

In the prior art, this type of video game relies on a technique involving acquisition of a so-called frame difference and recognizing movement within a portion when a change that is greater than a predetermined level is detected in this portion. The frame difference refers to the difference between an immediately preceding frame and the current frame (i.e., difference in pixel information between pixels of the frames, the pixel information corresponding to a color signal in RGB format, a brightness signal in YUV format, a signal representing the difference between a brightness signal and a red color signal, or a signal representing the difference between a brightness signal and a blue color signal, for example). Also, in the prior art, one or more images such as button items are arranged on a monitor screen for controlling the playing of a game and an image of a hand or some other movable part is arranged to be moved over the button items to realize game operations.

In the technique relying on detection of movement of an image of a hand over one or more button items as is described above, the image of the player has to be displayed on the monitor screen. Therefore, a display screen such as a CG (Computer Graphics) screen representing features of the game may not be displayed on the entire monitor screen, and the game content may be degraded. Also, in this technique, operations are limited since an action may only be induced by activating the button item; that is, more detailed operations such as successively controlling the movement or position of a game character, for example, that may be realized by an analog stick type game controller (i.e., a game controller that is capable of outputting operations information including intermediate values by tilting a stick-type operations unit in up/down/left/right directions using fingers) may not be realized.

Accordingly, in order to enable more detailed game operations, a technique is proposed for detecting the pose of a player based on the positioning of the hand of the player in addition to inducing action by moving the hand over a button item, for example. In this case, some poses may not be detected based merely on the frame difference as is described above, and in a case where the player remains still, the pose of the player may not be detected based on the frame difference. Accordingly, the concept of a so-called background difference is introduced. Background difference refers to a difference (i.e., pixel information difference) between a background image that does not include an image of the player and a current image that includes the image of the player. According to an example, the background difference may be acquired and a portion at which a change exceeding a predetermined level is detected may be determined to correspond to a portion at which the hand of the player is positioned.

By introducing the concept of background difference to the video game using an image supplied by a camera as is described above, a number of poses may be detected, and more detailed game operations may be performed. In such a case, the background image without the player being shown has to be captured and stored beforehand.

However, if the player is moved away from the camera in order to capture the background image, command input based on image recognition (i.e., inducing action by moving the hand of the player over a button item) may not be realized. Therefore, a game controller has to be used. However, this means that the advantageous feature of not requiring a game controller in this type of video game using an input image supplied by a camera may be lost.

SUMMARY OF THE INVENTION

The present invention has been conceived in response to one or more of the problems of the related art, and its object is to provide a technique for acquiring a background image that is required for calculating a background difference in a video game that uses an input image supplied by a camera, which technique enables acquisition of the background image while enabling command input based on image recognition of a player image.

According to an aspect of the present invention, a background image acquisition method is provided for acquiring a background image that is required for calculating a background difference in a video game that uses an input image supplied by a camera, the method including the steps of:

compositing a button item for responding to an operation of a player with a portion of an image captured by the camera which captured image includes a player image representing the posture of the player;

displaying the composite image on a monitor screen;

guiding the player into position such that the player image is accommodated within the portion of the captured image; and acquiring an image of a region of the captured image other than the portion as the background image.

In a preferred embodiment, the background image acquisition method of the present invention further includes the steps of:

defining a first region and a second region of the captured image; and acquiring a first image of the first region and a second image of the second region as the background image.

In another preferred embodiment of the present invention, the first region includes a first section and the second region includes a second section which first section and second section overlap each other.

In another preferred embodiment, the background image acquisition method of the present invention further includes the steps of:

outputting a message for prompting reinitiation of the background image acquisition upon determining that the camera has moved from a time of acquiring the first image of the first region to a time of acquiring the second image of the second region.

In another preferred embodiment, the background image acquisition method of the present invention further includes a step of:

determining whether the camera has moved based on an image difference between the first section of the first region and the second section of the second region.

In another preferred embodiment of the present invention, the region of the captured image other than the portion includes a right side region and a left side region of the captured image, and a right side image of the right side region and a left side image of the left side region are acquired as that background image.

In another preferred embodiment, the background image acquisition method of the present invention further includes a step of:

halting the background image acquisition and outputting a message for prompting reinitiation of the background image acquisition upon determining that a moving object is included in the region of the captured image for acquiring the background image.

In another preferred embodiment, the background image acquisition method of the present invention further includes a step of:

determining whether a moving object is included in the region of the captured image for acquiring the background image based on a frame difference of the image of the region.

According to another aspect of the present invention, a video game apparatus is provided that is configured to execute a video game that uses an input image supplied by a camera, the apparatus including:

an operations part for compositing a button item for responding to an operation of a player with a portion of an image captured by the camera which captured image includes a player image representing the posture of the player, displaying the composite image on a monitor screen, and guiding the player into position such that the player image is accommodated within the portion of the captured image; and a background acquiring part for acquiring an image of a region of the captured image other than the portion as the background image.

According to another aspect of the present invention, a computer-readable medium containing a program run on a computer is provided for acquiring a background image that is required for calculating a background difference in a video game that uses an input image supplied by the camera, the program being executed by the computer to realize the functions of:

compositing a button item for responding to an operation of a player with a portion of an image captured by the camera which captured image includes a player image representing the posture of the player, displaying the composite image on a monitor screen, and guiding the player into position such that the player image is accommodated within the portion of the captured image; and acquiring an image of a region of the captured image other than the portion as the background image.

According to another aspect of the present invention, a background image acquisition program run on a computer is provided for acquiring a background image that is required for calculating a background difference in a video game that uses an input image supplied by a camera, the program being executed by the computer to realize the functions of:

compositing a button item for responding to an operation of a player with a portion of an image captured by the camera which captured image includes a player image representing the posture of the player, displaying the composite image on a monitor screen, and guiding the player into position such that the player image is accommodated within the portion of the captured image; and acquiring an image of a region of the captured image other than the portion as the background image.

DETAILED DESCRIPTION OF THE PREFERRED EMBODIMENTS

In the following, preferred embodiments of the present invention are described with reference to the accompanying drawings.

Figure 1:
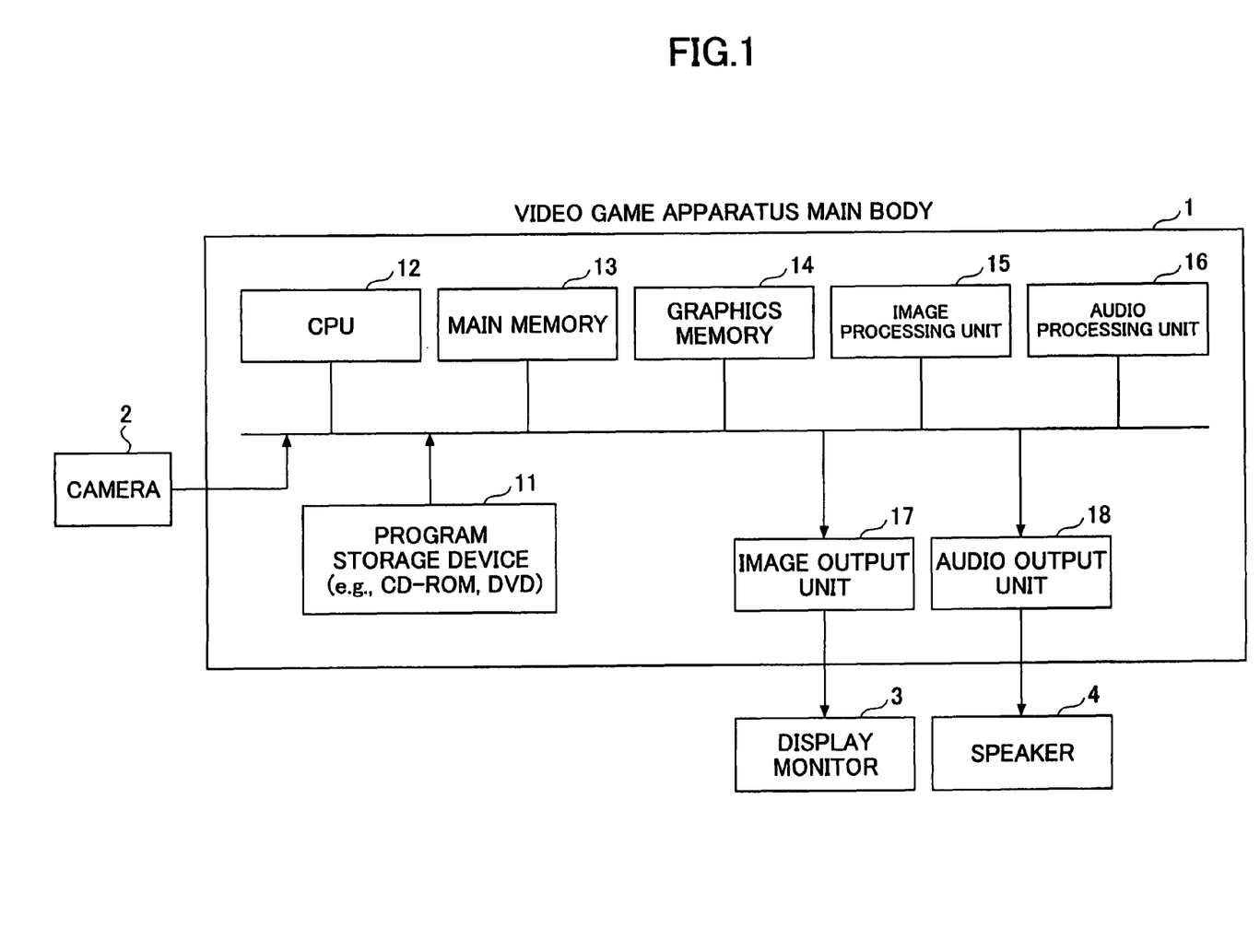
FIG. 1 is a block diagram showing a configuration of a game apparatus according to an embodiment of the present invention.

FIG. 1 is a block diagram showing a configuration of a video game apparatus according to an embodiment of the present invention.

The video game apparatus shown in FIG. 1 includes a video game apparatus main body 1 and a camera 2, a display monitor 3 such as a television monitor, and a speaker 4 that are connected to the video game apparatus main body 1 via a USB (Universal Serial Bus) cable, for example. It is noted that the camera 2 does not necessarily have to be directly connected to the video game apparatus main body 1, and may be connected thereto via a network, for example.

The video game apparatus main body 1 includes a program storage device 11 such as a CD-ROM or a DVD in which game software (program) is stored, a CPU 12 that executes overall control processes of the video game apparatus 1, a main memory 13 that temporarily stores programs and data used in executing control processes, a graphics memory (storage) 14 that stores image data, an image processing unit 15 that generates and controls an image according to game content, an audio processing unit 16 that generates and controls audio, an image output unit 17 that outputs an image signal to the display monitor 3, and an audio output unit 18 that outputs audio to the speaker 4.

Figure 2:
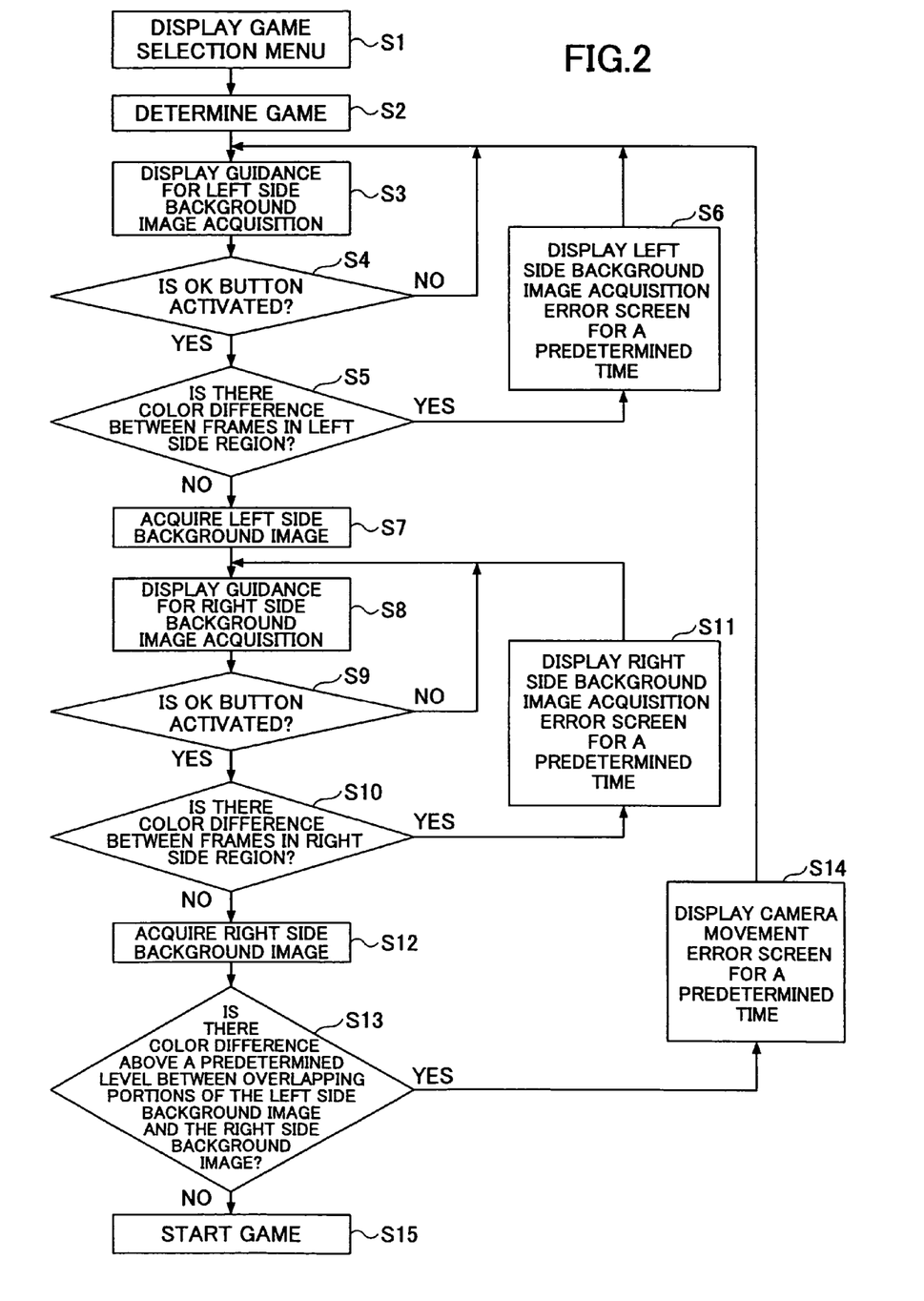
FIG. 2 is a flowchart showing the steps for performing a background image acquisition process according to an embodiment of the present invention.

FIG. 2 is a flowchart illustrating steps of a background image acquisition process for acquiring a background image that is required for calculating a background difference in the video game apparatus shown in FIG. 1. It is noted that the illustrated background image acquisition process may be executed by the CPU 12 of the video game apparatus main body 1 using relevant programs.

In the illustrated example of FIG. 2, when a game is started, a game selection menu is displayed on the display monitor 3 shown in FIG. 1 (step S1), and a game to be played is determined according to a selection made by a player (step S2). It is noted that in the present example, it is assumed that plural mini games are included in one set of game software; however, in a case where the game software includes only one game, steps S1 and S2 may be omitted.

Figure 3:
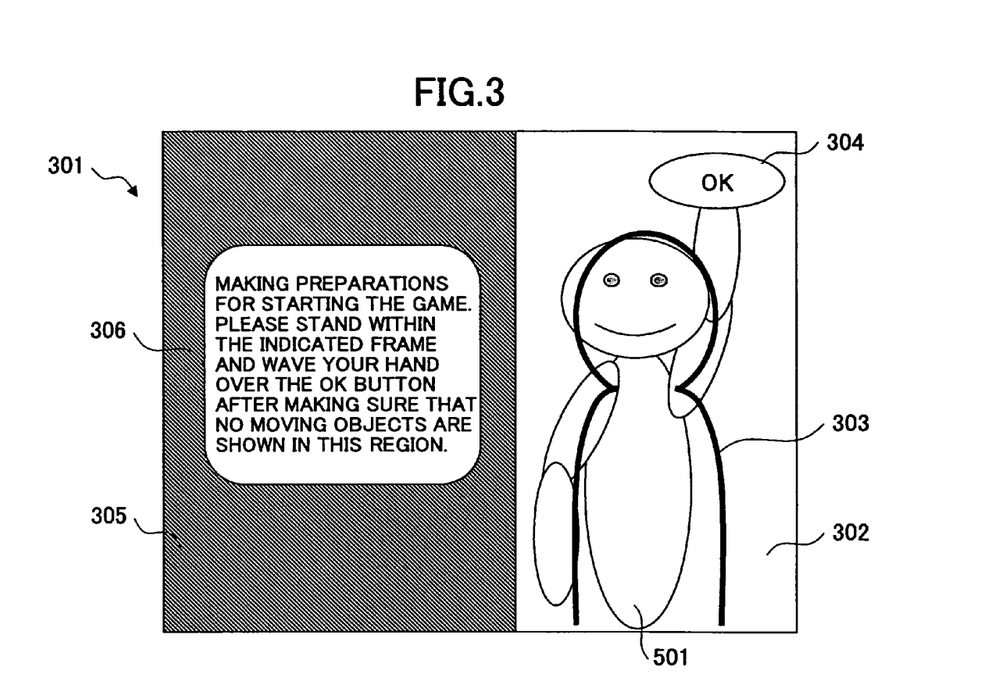
FIG. 3 is a diagram showing an exemplary screen that may be displayed upon performing a left side background image acquisition process.

Then, guidance for acquiring a left side background image is displayed on the display monitor 3 (step S3). FIG. 3 is a diagram showing an exemplary screen that may be displayed upon performing a left side background image acquisition process. In FIG. 3, a frame 303 indicating a standing position outline for a player 501 and a button item 304 that is to be operated by the player 501 are displayed at a right side operation region 302 on the right side of a monitor screen 301, and a message 306 indicating, "MAKING PREPARATIONS FOR STARTING THE GAME. PLEASE STAND WITHIN THE INDICATED FRAME AND WAVE YOUR HAND OVER THE OK BUTTON AFTER MAKING SURE THAT NO MOVING OBJECTS ARE SHOWN IN THIS REGION." is displayed at a left side background acquisition region 305 on the left side of the monitor screen 301. It is noted that the left side background acquisition region 305 is arranged to be slightly larger than half the monitor screen 301 so that an overlapping portion with a right side background acquisition region 311 (see FIG. 5) may be provided as is described below. In this way, influence from noise generated at the dividing portion between the left and right background acquisition regions 305 and 311 may be reduced, and a determination may be made as to whether the camera has been moved during acquisition of the background image based on the image difference between the overlapping portions of the left and right background acquisition regions 305 and 311.

Referring back to FIG. 2, a determination is made as to whether the OK button is activated (step S4). If the OK button is not activated, the guidance for left side background image acquisition continues to be displayed (step S3). If the OK button is activated, a determination is made as to whether there is any moving object included in the left side background acquisition region 305 based on the frame difference (i.e., difference in pixel information between pixels of frames) detected within the region 305 (step S5). It is noted that if a moving object is included in a background acquisition region, its corresponding image cannot be used as a background image for calculating the background difference; therefore, the existence of a moving object is checked for before acquisition of the background image in order to improve efficiency.

Figure 4:
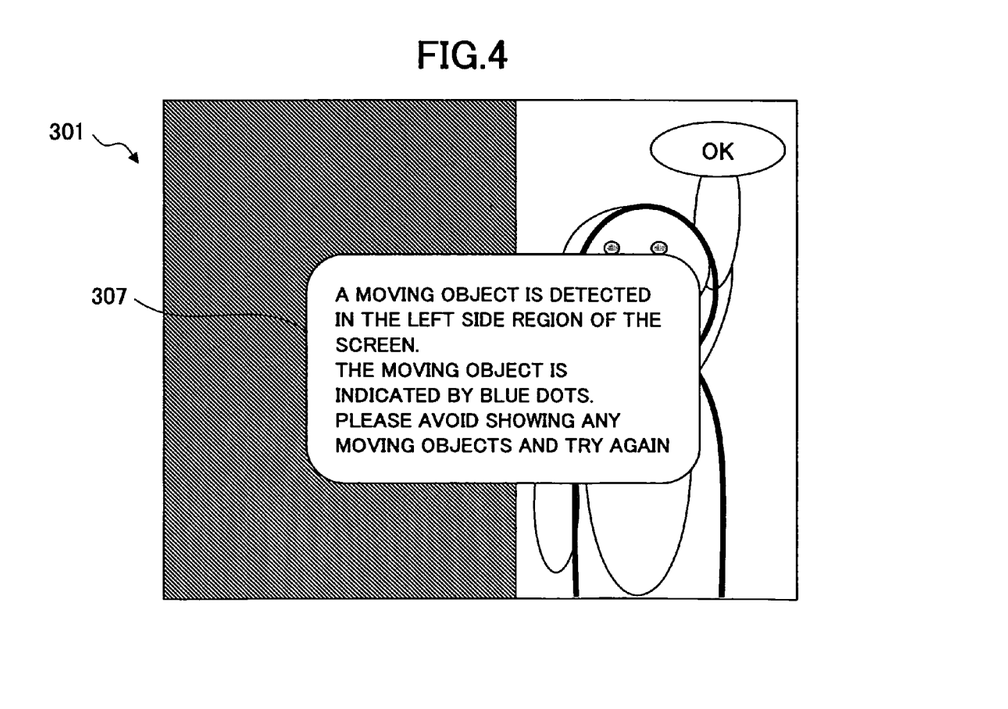
FIG. 4 is a diagram showing an exemplary error screen that may be displayed when the left side background image acquisition process fails.

When it is determined in step S5 that a moving object exists, an error screen is displayed on the monitor careen 301 for a predetermined period of time (step S6). FIG. 4 is a diagram showing an exemplary error screen that may be displayed when the left side background image acquisition process fails. In FIG. 4, a message 307 indicating, "A MOVING OBJECT IS DETECTED IN THE LEFT SIDE REGION OF THE SCREEN. THE MOVING OBJECT IS INDICATED BY BLUE DOTS. PLEASE AVOID SHOWING ANY MOVING OBJECTS AND TRY AGAIN." is displayed on the monitor screen 301.

Referring back to FIG. 2, when it is determined in step S5 that a moving object is not included in the left side background acquisition region 305, the image of the background acquisition region 305 is acquired as a background image (step S7).

Figure 5:
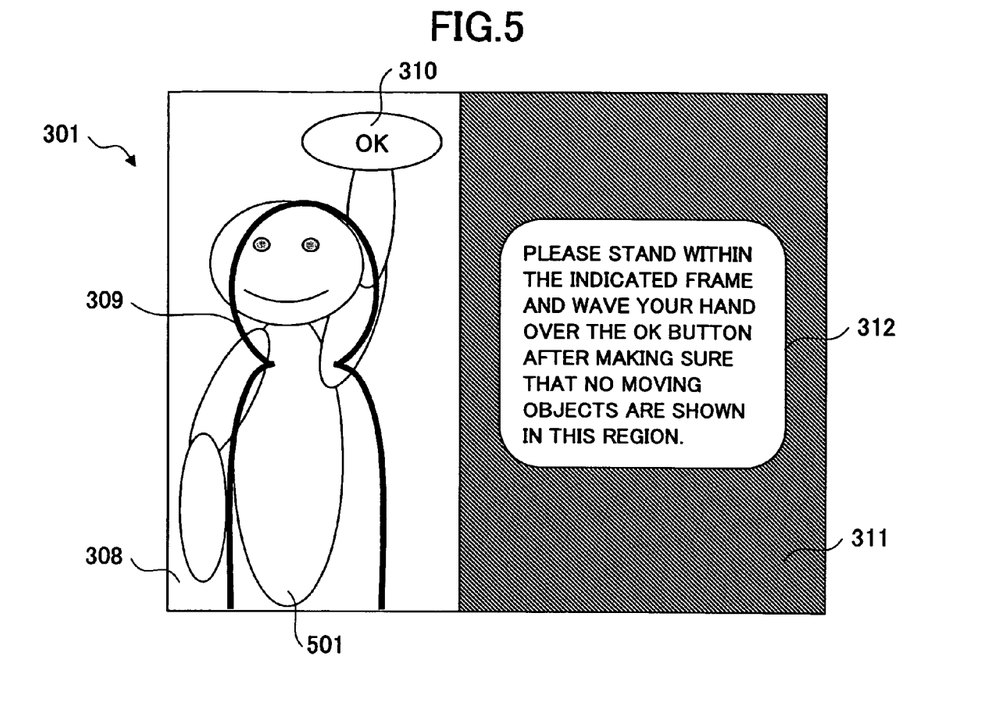
FIG. 5 is a diagram showing an exemplary screen that may be displayed upon performing a right side background image acquisition process.

Then, guidance for acquiring a right side background image is displayed on the display monitor 3 (step S8). FIG. 5 is a diagram showing an exemplary screen that may be displayed upon performing a right side background image acquisition process. In FIG. 5, a frame 309 indicating a standing position outline for the player 501 and a button item 310 to be operated by the player 501 are displayed at a left side operation region 308 on the left side of the monitor screen 301, and a message 312 indicating, "PLEASE STAND WITHIN THE INDICATED FRAME AND WAVE YOUR HAND OVER THE OK BUTTON AFTER MAKING SURE THAT NO MOVING OBJECTS ARE SHOWN IN THIS REGION." is displayed at a right side background acquisition region 311 on the right side of the monitor screen 301.

Then, referring back to FIG. 2, a determination is made as to whether the OK button is activated (step S9). If the OK button is not activated, the guidance for right side background image acquisition continues to be displayed (step S8). If the OK button is activated, a determination is made as to whether a moving object is included in the right side background acquisition region 311 based on a frame difference detected in this region 311 (step S10).

Figure 6:
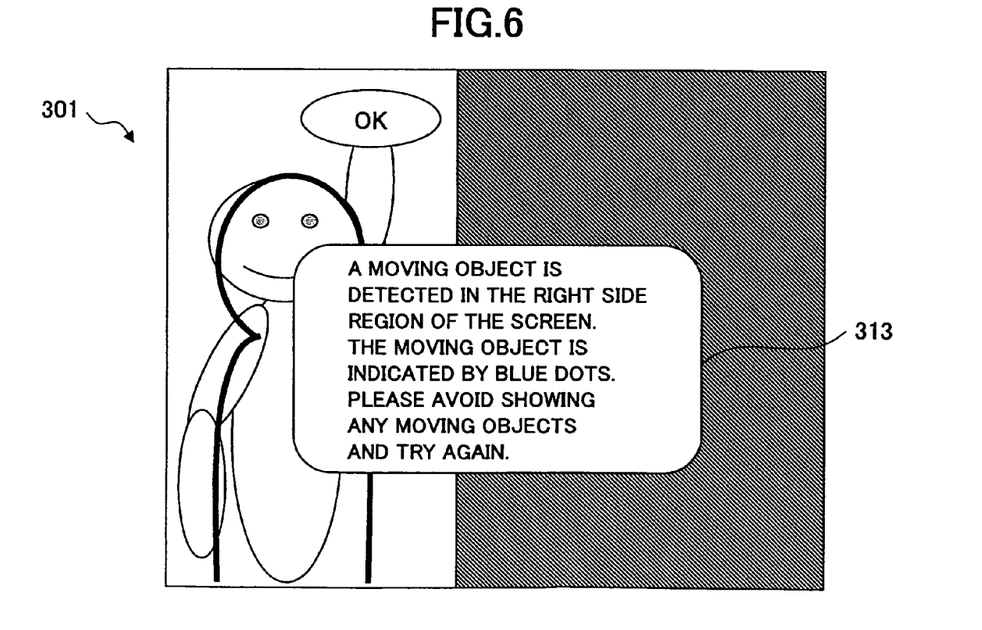
FIG. 6 is a diagram showing an exemplary screen that may be displayed when the right side background image acquisition process fails.

When it is determined in step S10 that a moving object is included in the right side background acquisition region 311, an error screen is displayed for a predetermined period of time (step S11). FIG. 6 is a diagram showing an exemplary error screen that may be displayed when the right side background image acquisition process fails. In FIG. 6, a message 313 indicating, "A MOVING OBJECT IS DETECTED IN THE RIGHT SIDE REGION OF THE SCREEN. THE MOVING OBJECT IS INDICATED BY BLUE DOTS. PLEASE AVOID SHOWING ANY MOVING OBJECTS AND TRY AGAIN." is displayed on the monitor screen 301.

Referring back to FIG. 2, when it is determined in step S10 that no moving objects are included in the right side background acquisition region 311, the image of the right side background acquisition region 311 is acquired as a background image (step S12).

Figure 7:
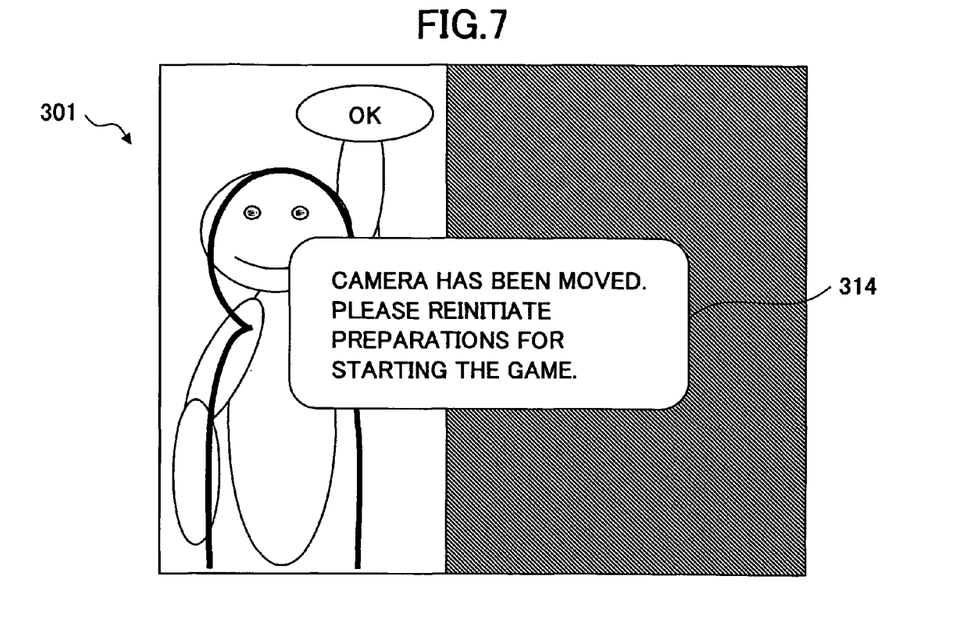
FIG. 7 is a diagram showing an exemplary screen that may be displayed when a camera is moved from the time of acquiring a left side background image to the time of acquiring a right side background image.

Then, a determination is made as to whether a color difference above a predetermined level is detected between overlapping portions of the left side background image and the right side background image (step S13). If such a color difference above the predetermined level is detected, an error screen is displayed (step S14), and the operation goes back to the step of displaying the guidance for left side background image acquisition (step S3). FIG. 7 is a diagram showing an exemplary screen that may be displayed in a case where the camera is moved from the time of acquiring the left side background image to the time of acquiring the right side background image. In FIG. 7, a message 314 indicating, "CAMERA HAS BEEN MOVED. PLEASE REINITIATE PREPARATIONS FOR STARTING THE GAME." is displayed on the monitor screen 301.

Referring back to FIG. 2, in a case where a color difference exceeding a predetermined level is not detected between the overlapping regions of the left side background image and the right side background image, the background image acquisition process is ended and the game is started (step S15).

Figure 8:
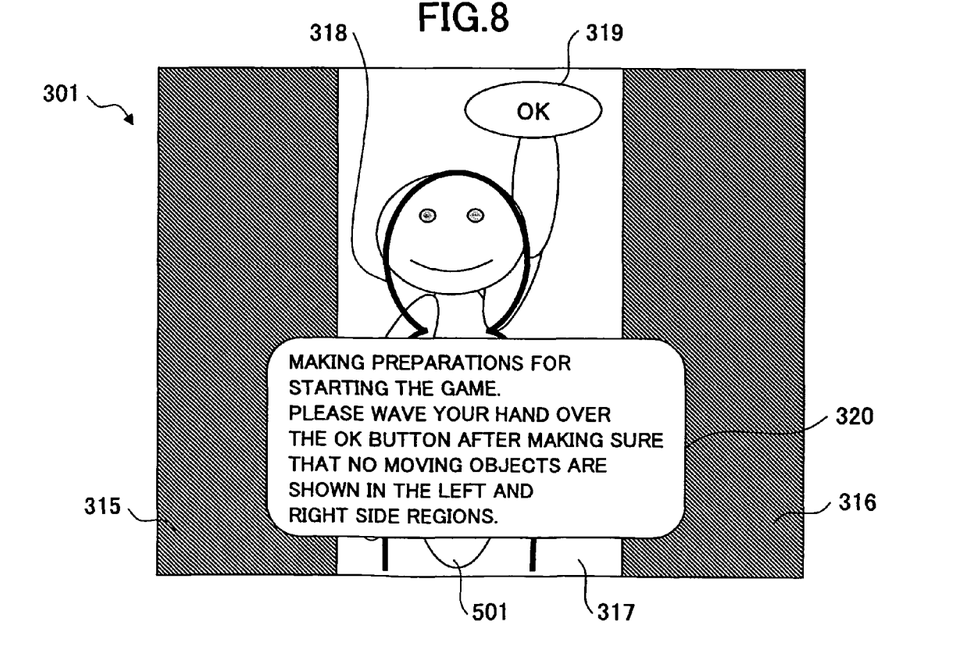
FIG. 8 is a diagram showing an exemplary screen that may be displayed when only images of left and right side edge regions are acquired in the background image acquisition process.

FIG. 8 is a diagram showing an exemplary screen that may be displayed when only images of left and right side edge regions are acquired in the background image acquisition process. In the process described with reference to FIGS. 2 through 7, a background image of the entire region that is captured by the camera is acquired; however, in some games, the background difference may only be required for certain portions of the region being captured. In this case, the background images of such portions may be acquired.

In the example shown in FIG. 8, background images of background acquisition regions 315 and 316 corresponding to left and right side edge regions with predetermined widths are arranged to be acquired. In this case, a frame 318 indicating a standing position outline for the user 501 and a button item 319 to be operated by the player 501 are displayed at a central operation region 317, and a message 320 indicating, "MAKING PREPARATIONS FOR STARTING THE GAME. PLEASE WAVE YOUR HAND OVER THE OK BUTTON AFTER MAKING SURE THAT NO MOVING OBJECTS ARE SHOWN IN THE LEFT AND RIGHT SIDE REGIONS." is displayed.

It is noted that the messages for providing information and guidance to the user as is described in the above examples do not necessarily have to be output in the form of a display screen, and for example, one or more messages may alternatively be output in the form of a voice message.

According to an aspect of the present invention, in acquiring a background image necessary for calculating a background difference, a button item that responds to an operation of a player is composited with a portion of an image captured by a camera which captured image includes an image of the posture of a player to generate a composite image to be displayed on a monitor screen, the player is guided so that the player image is accommodated within the portion of the captured image, and an image of a region of the captured image other than the portion is acquired as a background image. In this way a background image may be acquired while enabling command input based on image recognition of the player image, and the player may be relieved of inconveniences such as having to use a game controller.

The following descriptions relate to pose detection that is realized using a background image acquired through the background image acquisition process as is described above.

Figure 9:
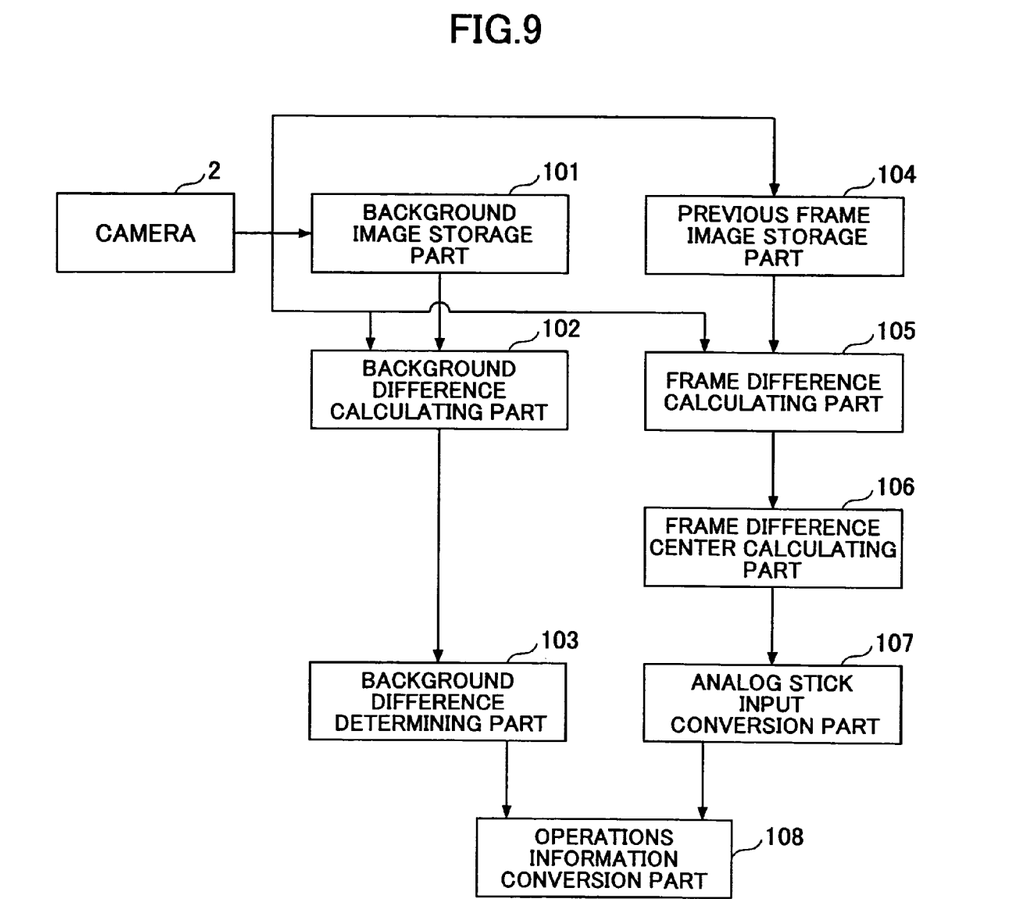
FIG. 9 is a block diagram showing a functional configuration for realizing pose detection.

FIG. 9 is a block diagram showing a functional configuration for realizing pose detection. According to the illustrated example, pose detection may rely on functional parts pertaining to background difference including a background image storage part 101 for storing a background image acquired from the camera 2, a background difference calculating part 102 for calculating a difference (background difference) between a current image captured by the camera 2 and the background image stored by the background image storage part 101, and a background difference determining part 103 for determining whether there is a background difference in a predetermined region.

Also, pose detection according to the present example may rely on functional parts pertaining to frame difference including a previous frame image storage part 104 for storing a previous frame image captured by the camera 2, a frame difference calculating part 105 for calculating a difference (frame difference) between a current image captured by the camera 2 and the previous frame image stored by the previous frame image storage part 104, a frame difference center calculating part 106 for calculating a frame difference center position within a predetermined region, and an analog stick input conversion part 107 for converting an input command into a signal corresponding to an analog stick signal from a game controller based on the center position of the frame difference calculated by the frame difference center calculating part 106. Further, pose detection according to the present example may rely on a functional part for integrating the background difference detection result and the frame difference detection result which functional part is embodied by an operations information conversion part 108 for generating operations information for a game character based on the determination result of the background difference determining part 103 and the analog stick signal from the analog stick input conversion part 107.

Figure 10:
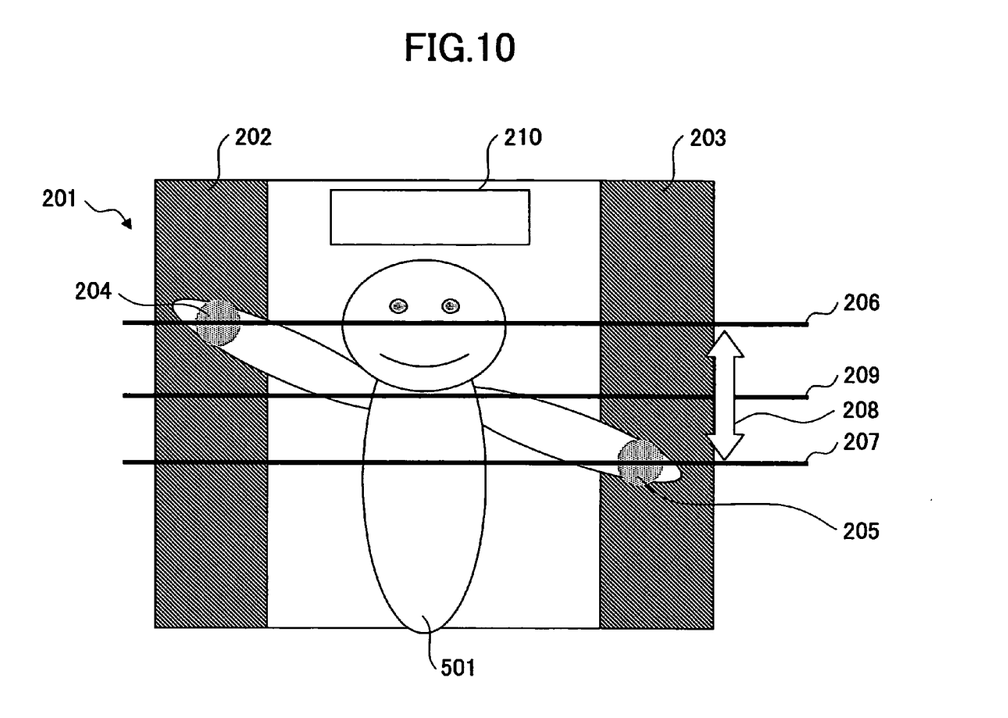
FIG. 10 is a diagram illustrating an exemplary image processing operation for realizing pose detection.

FIG. 10 is a diagram illustrating an exemplary image processing operation for realizing pose detection using the functional parts shown in FIG. 9.

In the illustrated example of FIG. 10, the frame difference calculating part 105 calculates the frame difference for a captured image 201 captured by the camera 2, and the frame difference center calculating part 106 calculates frame difference centers 204 and 205 corresponding to the positions of the hands (arms) of the player 501 detected within regions 202 and 203 corresponding to left and right side regions, respectively, with predetermined widths.

Specifically, center positions 206 and 207 corresponding to height positions of the frame difference centers 204 and 205 of the regions 202 and 203 are calculated, respectively, and a difference (height difference) 208 between the left and right side center positions 206 and 207 and an average value (average height value) 209 of the calculated left and right side center positions 206 and 207 are calculated.

The analog stick input conversion part 107 outputs a value obtained by multiplying the difference 208 between the centers 206 and 207 by a predetermined coefficient as a left/right direction signal of an analog stick signal, and outputs a value obtained by multiplying the average value 209 of the centers 206 and 207 by a predetermined coefficient as an up/down direction signal of the analog stick signal.

Also, the background difference calculating part 102 calculates the background difference for the captured image 201. The background difference determining part 103 determines whether there are background differences in the left and right side regions 202 and 203 as well as a region 210. It is noted that in a case where pose detection is limited to detecting poses based on the positions of centers 204 and 205 for the left and right hands of the player 501 (e.g., spreading arms (hands) in left-right directions and simultaneously raising/lowering arms, or alternatingly raising/lowering left and right arms), the determination of whether a background difference is detected in the region 210 may be unnecessary. However, when the pose detection is arranged to detect a pose with both hands (arms) directed downward to signal a "HALT" command, or a pose with both hands directed upward to signal an "ABRUPTLY ACCELERATE" command, for example, the pose detection relies on the existence of background differences in the regions 202 and 203 as well as the region 210 (it is noted that a detection region for detecting the existence of hands in a lower side region is not provided since such positioning of the hands of the player 501 is difficult to detect owing to the fact that the image of the hands may not be easily distinguished from the image of the body). Specifically, when the left and right hands of the player 501 are directed upward or downward, the centers 204 and 205 for the left and right hands of the player 501 may not be detected in which case no background differences would be detected in the regions 202 and 203. In this case, when no background difference is detected in the region 210, it may be determined that the hands of the player 501 are directed downward. Also, when no background differences are detected in the regions 202 and 203, and a background difference is detected in the region 210, it may be determined that the hands of the player 501 are directed upward.

In the above described example, the centers 204 and 205 of the hands of the player 501 are detected based on background difference; however, in another example, the detection may be realized based on frame difference. In such an example, a frame difference may not be detected when there is no movement in the hands of the player 501, and a previous detection state is maintained in such a case. The detection based on background difference has an advantage in that a pose may be detected even when there is no movement in the hands of the player 501. Also, it is noted that frame difference may be used in place of background difference in the detection region 210 as well; however, background difference is preferably used in order to realize more accurate image recognition.

Figure 11:
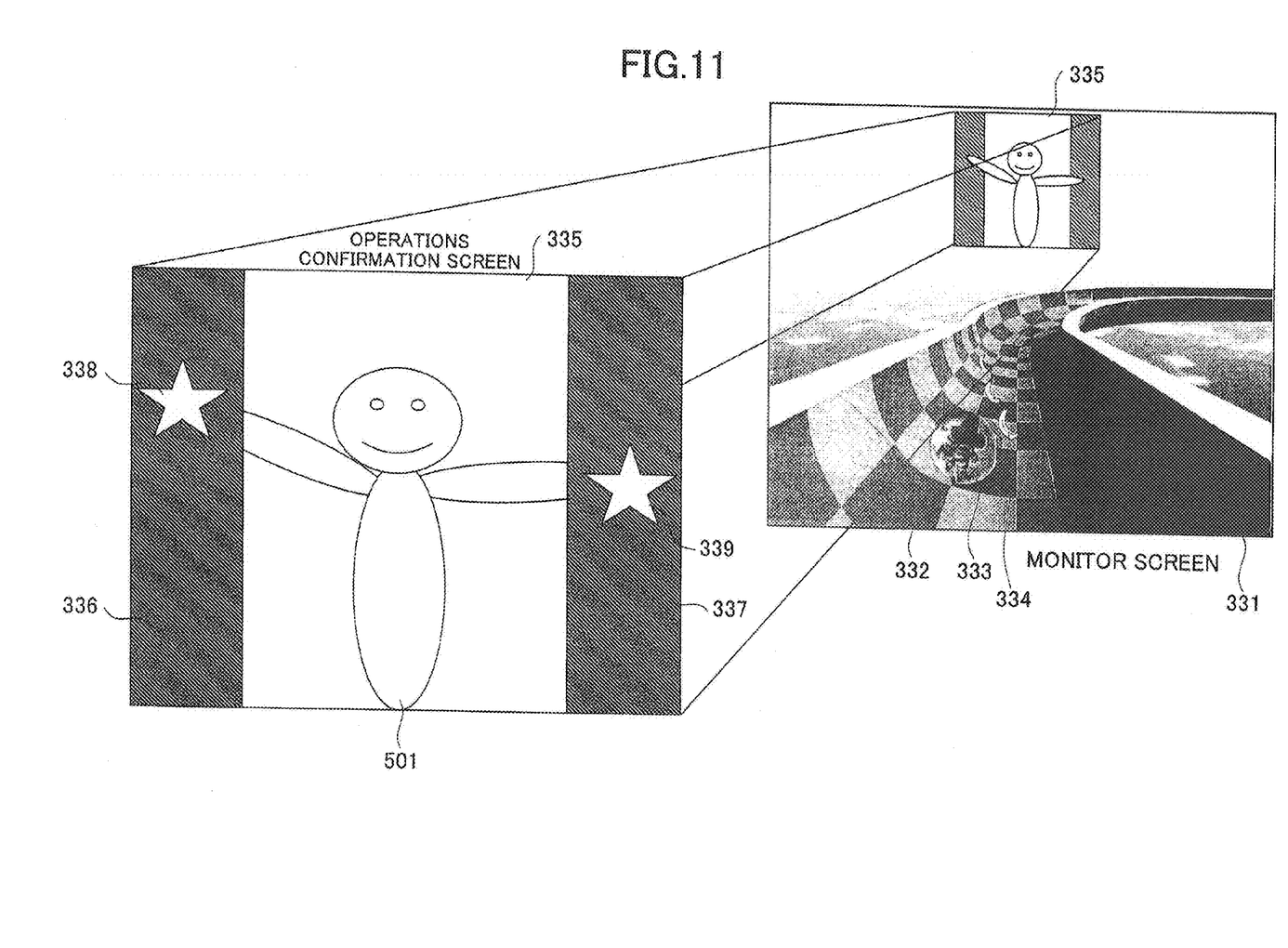
FIG. 11 is a diagram showing an exemplary screen that may be displayed on a monitor screen upon performing pose detection.

FIG. 11 is a diagram showing an exemplary screen that may be displayed on a monitor screen upon performing pose detection. In FIG. 11, a game screen is displayed on the monitor screen 331 of the display monitor 3 (see FIG. 1), and an operations confirmation screen 335 for realizing pose detection is displayed at a portion of the monitor screen 331. In the illustrated game screen, a boat 333 that is driven by a game character (e.g., monkey) is maneuvered along a winding course 332 to catch items (e.g., bananas 334) provided along the course 332.

As is shown in the enlarged operations confirmation screen 335 of FIG. 11, in regions 336 and 337 for detecting the positions of the hands (arms) of the player 501, the detected positions of the hands are arranged to be indicated by markers 338 and 339.

Figure 12A:
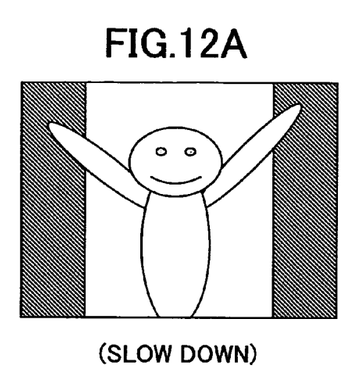
FIGS. 12A through 12E are diagrams illustrating poses that may be detected in pose detection according to one example.
Figure 12B:
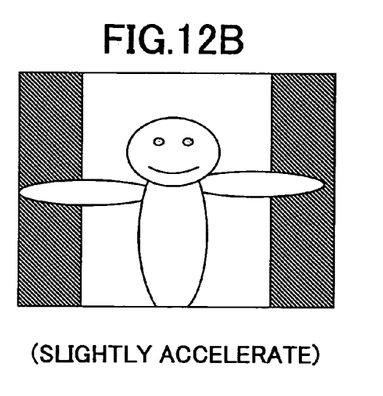
Figure 12C:
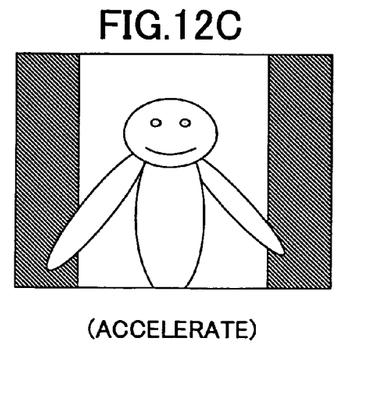
Figure 12D:
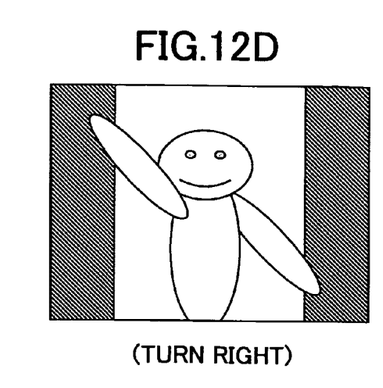
Figure 12E:
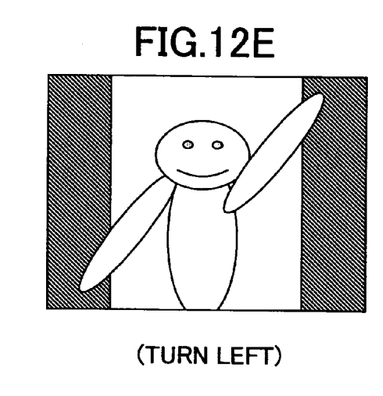

FIGS. 12A through 12E are diagrams illustrating exemplary poses that may be detected in pose detection for the game shown in FIG. 11. FIG. 12A shows a pose with both hands spread out and raised that represents a "SLOW DOWN" command; FIG. 12B shows a pose with both hands spread out in horizontal directions that represents a "SLIGHTLY ACCELERATE" command; FIG. 12C shows a pose with both hands spread out and lowered that represents an "ACCELERATE" command; FIG. 12D shows a pose with the left hand being raised and the right hand being lowered that represents a "TURN RIGHT" command; and FIG. 12E shows a pose with the right hand being raised and the left hand being lowered that represents a "TURN LEFT" command. It is noted that in the present example, the intermediate (transitional) states of the poses are also detected, and operations information is generated in an analog fashion.

Figure 13:
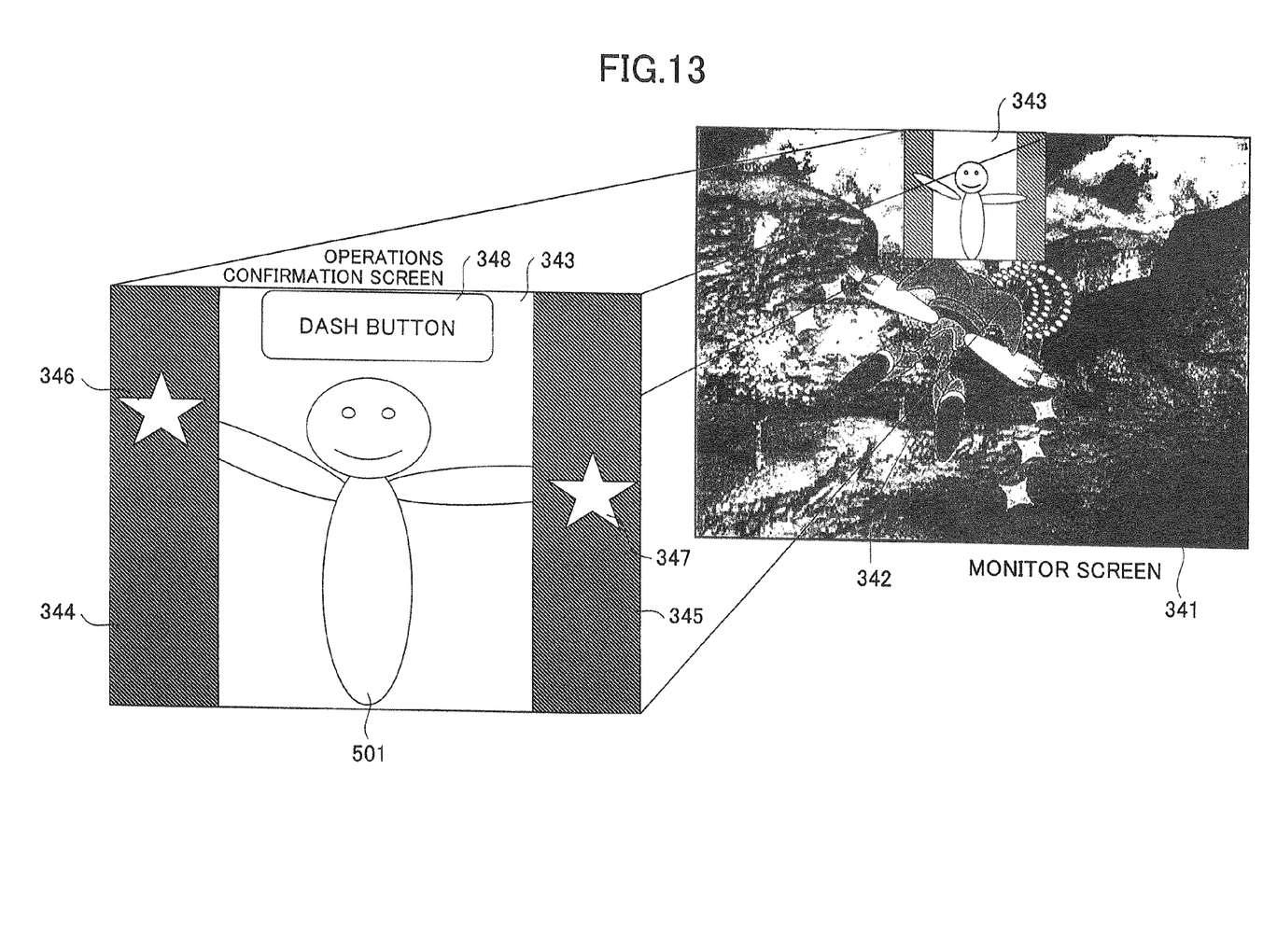
FIG. 13 is a diagram showing another exemplary screen that may be displayed on a monitor screen upon performing pose detection.

FIG. 13 is a diagram showing another exemplary screen that may be displayed on a monitor screen upon performing pose detection. In FIG. 13, a game screen is displayed on the monitor screen 341 of the display monitor 3, and an operations confirmation screen 343 for realizing pose detection is displayed at a portion of the monitor screen 341. In the illustrated game screen, a game character 342 is arranged to fly in the displayed region.

As is shown in the enlarged operations confirmation screen of FIG. 13, in regions 344 and 345 for detecting the positions of the hands (arms) of the player 501, the detected positions of the hands are indicated by markers 346 and 347. Also, in the illustrated operations confirmation screen, a dash button 348 for abruptly increasing the flying speed is displayed at an upper region. It is noted that this dash button 348 is an example of the region 210 shown in FIG. 10.

Figure 14A:
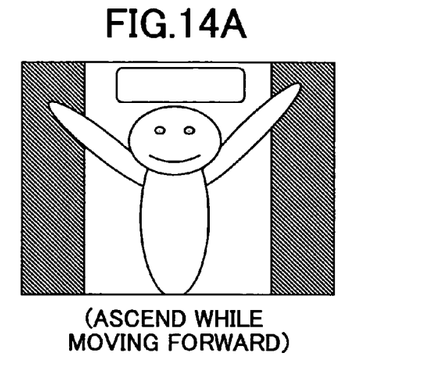
FIGS. 14A through 14F are diagrams illustrating poses that may be detected in pose detection according to another example.
Figure 14B:
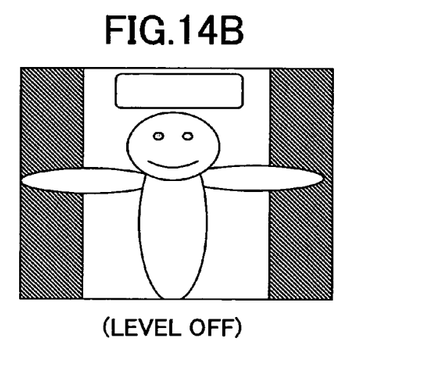
Figure 14C:
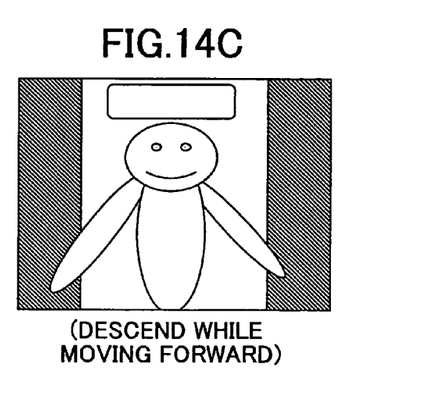
Figure 14D:
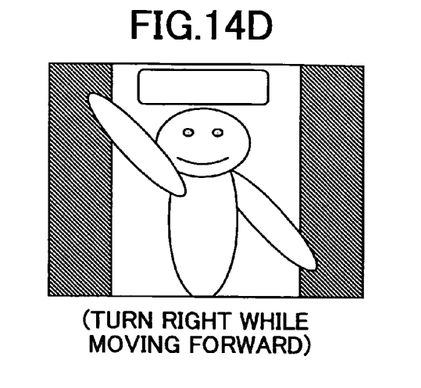
Figure 14E:
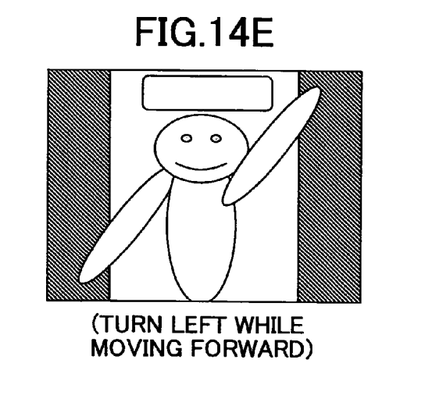
Figure 14F:
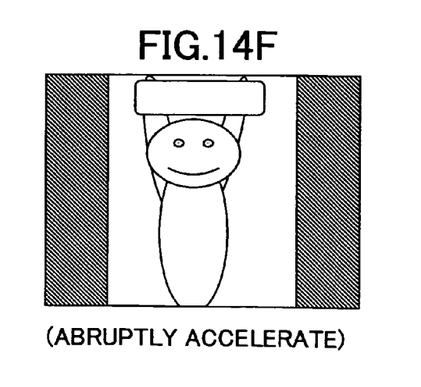

FIGS. 14A through 14I are diagrams illustrating exemplary poses that may be detected in pose detection for the game shown in FIG. 13. FIG. 14A shows a pose with both hands spread out and raised that represents an "ASCEND WHILE MOVING FORWARD" command; FIG. 14B shows a pose with both hands spread out in horizontal directions that represents a "LEVEL OFF" command; FIG. 14C shows a pose with both hands spread out and lowered that represents a "DESCEND WHILE MOVING FORWARD" command; FIG. 14D shows a pose with the left hand being raised and the right hand being lowered that represents a "TURN RIGHT WHILE MOVING FORWARD" command; FIG. 14E shows a pose with the right hand being raised and the left hand being lowered that represents a "TURN LEFT WHILE MOVING FORWARD" command; FIG. 14F shows a pose with both hands raised that represents an "ABRUPTLY ACCELERATE" command; FIG. 14G shows a pose with the left hand being directed downward and the right hand being directed horizontally that represents a "TURN RIGHT IN HALT STATE" command; FIG. 14H shows a pose with the right hand being directed downward and the left hand being directed horizontally that represents a "TURN LEFT IN HALT STATE" command; and FIG. 14I shows a pose with a "HALT" command. It is noted that in the present example, intermediate (transitional) states of the poses are also detected, and operations information is generated in an analog fashion.

According to an aspect of the present invention, a player does not have to move out of the view of a camera in acquiring a background image that is required for calculating a background difference, and the background image may be acquired while enabling command input through image recognition of the player image so that a game controller does not have to be used in the background image acquisition.

It is noted that embodiments within the scope of the present invention include a background image acquisition method, a video game apparatus, a background image acquisition program, and computer-readable medium containing a computer program. The background image acquisition program may be embodied in any computer-readable medium for carrying or having computer-executable instructions or data structures stored thereon. Such a computer-readable medium can be any available medium which can be accessed by a general purpose or a special purpose computer. By way of example, and not limitation, such a computer-readable medium can comprise a physical storage medium such as a RAM, a ROM, an EEPROM, a CD-ROM, other optical disk storage devices, other magnetic storage devices, or any other medium which can be used to carry or store desired program code means in the form of computer-executable instructions or data structures and which can be accessed by a general purpose or special purpose computer. Such a medium may include a wireless carrier signal, for example. When information is transferred or provided over a network or other communications connection (either hard-wired, wireless, or combinations thereof) to a computer, the computer properly views the connection as a computer-readable medium. Thus, any such connection is properly termed a computer-readable medium. Combinations of the above should also be included within the scope of the computer-readable medium. Computer-executable instructions comprise, for example, instructions and data which cause a general purpose computer, a special purpose computer, or a processing device to perform a certain function or a group of functions.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No.2004-255947 filed on Sep. 2, 2004, the entire contents of which are hereby incorporated by reference.

What is claimed is:

1. A background image acquisition method for acquiring a background image that is required for calculating a background difference in a video game that uses an input image supplied by a camera, the method comprising the steps of:
   compositing a button item for responding to an operation of a player with a portion of a frame image captured by the camera which captured frame image includes a player image representing a posture of the player;
   displaying the composite image on a monitor screen;
   defining a first region and a second region of the captured frame image to be acquired as the background image; wherein the first region includes a first section and the second region includes a second section,
   guiding the player into position such that the player image is accommodated within said portion of the captured frame image; overlapping a section of one region with a section of the second region for making a determination as to whether the camera has moved or a moving object has been captured in the background image based on the extent of any image difference between the overlapping sections of the two regions with the determination of movement being made before acquiring an image of a region of the captured image as the background image other than said portion,
   wherein the method further comprises the steps of:
   determining if the camera has moved and/or if movement of an object captured in the region for the background image has occurred by determining whether a color difference above a predetermined level is detected between the overlapping sections of the two regions; and
   if it is determined that movement has resulted from either of the movement of the camera or the movement of an object captured in the region for the background image, displaying an error indicative of a detected movement on the monitor screen such that the background difference can be calculated without detected movement.

2. The background image acquisition method as claimed in claim 1, further comprising the step of:
   acquiring a first image of the first region and a second image of the second region as the background image.

3. The background image acquisition method as claimed in claim 2, further comprising the step of:
   outputting a message for prompting reinitiation of the background image acquisition upon determining that the camera has moved from a time of acquiring the first image of the first region to a time of acquiring the second image of the second region.

4. The background image acquisition method as claimed in claim 1, further comprising the step of:
   determining whether the camera has moved based on an image difference between the first section of the first region and the second section of the second region.

5. The background image acquisition method as claimed in claim 1, wherein
   the region of the captured image other than said portion includes a right side region and a left side region of the captured image; and
   a right side image of the right side region and a left side image of the left side region are acquired as the background image.

6. The background image acquisition method as claimed in claim 1, further comprising a step of:
   halting the background image acquisition and outputting a message for prompting reinitiation of the background image acquisition upon determining that a moving object is included in the region of the captured image for acquiring the background image.

7. The background image acquisition method as claimed in claim 6, further comprising a step of:
   determining whether a moving object is included in the region of the captured image for acquiring the background image based on a frame difference of the image of the region.

8. A video game apparatus that is configured to execute a video game that uses an input image supplied by a camera, the apparatus comprising:
   a background image storage part for storing a background image acquired from the camera;
   a background difference calculation part for calculating a background difference between a current image presently captured by the camera and the background image previously stored in the image storage part;
   a background difference determining part for determining whether there is a background difference in a predetermined region;
   an operations part for compositing a button item for responding to an operation of a player with a portion of a frame image captured by the camera in the image storage part which captured frame image includes a player image representing a posture of the player, displaying the composite image on a monitor screen, wherein said background difference calculation part includes a part for defining a first region and a second region of the captured frame image to be acquired as the background image in which the first region includes a first section and the second region includes a second section;
   a part for guiding the player into position such that the player image is accommodated within said portion of the captured frame image;
   wherein said background difference determining part includes a movement determining part for overlapping a section of one region with a section of the second region for making a determination as to whether the camera has moved or a moving object has been captured in the background image based upon detecting whether a color difference above a predetermined level is detected between the overlapping sections of the two regions; and
   a background acquiring part for acquiring an image of a region of the captured image as the background image other than said portion based on the image difference between the overlapping sections of the two regions,
   wherein the apparatus further comprises:
   an error displaying part responsive to said movement determining part for displaying an error on the monitor screen if it is determined that the detected movement has resulted from either of the movement of the camera or the movement of an object captured in the region for the background image.

9. The video game apparatus as claimed in claim 8, wherein a first image of the first region and a second image of the second region are acquired as the background image.

10. The video game apparatus as claimed in claim 8, wherein the region of the captured image other than said portion includes a left side region and a right side region of the captured image, and a left side image of the left side region and a right side image of the right side region are acquired as the background image.

11. A non-transitory computer readable medium containing a program run on a computer for acquiring a background image that is required for calculating a background difference in a video game that uses an input image supplied by the camera, the program being executed by the computer to realize the functions of:

compositing a button item for responding to an operation of a player with a portion of a frame image captured by the camera in a background image storage part of the computer for storing a background image acquired from the camera which captured image includes a player image representing a posture of the player, displaying the composite image on a monitor screen, defining a first region and a second region of the captured frame image to be acquired as the background image, and guiding the player into position such that the player image is accommodated within said portion of the captured frame image; overlapping a section of one region with a section of the second region for making a determination as to whether the camera has moved or a moving object has been captured in the background image based upon detecting a color image difference between the overlapping sections of the two regions above a predetermined level and before acquiring an image of a region of the captured image as the background image other than said portion, wherein the program further comprises the functions of:

determining from the detected movement whether the detected movement has resulted from movement of the camera and/or movement of an object captured in the region for the background image; and if it is determined that the detected movement has resulted from either of the movement of the camera or the movement of an object captured in the region for the background image, displaying an error on the monitor screen.

12. The computer-readable medium as claimed in claim 11, wherein a first image of the first region and a second image of the second region are acquired as the background image.

13. The computer-readable medium as claimed in claim 11, wherein the region of the captured image other than said portion includes a left side region and a right side region of the captured image, and a left side image of the left side region and a right side image of the right side region are acquired as the background image.

\* \* \* \* \*